(12) United States Patent
Hecht

(10) Patent No.: US 8,246,277 B2
(45) Date of Patent: Aug. 21, 2012

(54) TOOL HOLDER FOR CLAMPING AN INSERT HOLDER

(75) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 538 days.

(21) Appl. No.: 12/613,226

(22) Filed: Nov. 5, 2009

(65) Prior Publication Data
US 2010/0135736 A1 Jun. 3, 2010

(30) Foreign Application Priority Data

Dec. 3, 2008 (IL) .......................................... 195696

(51) Int. Cl.
B23B 29/00 (2006.01)
B23B 29/22 (2006.01)
(52) U.S. Cl. ..................................... 407/87; 407/85
(58) Field of Classification Search .............. 407/47, 407/49, 85, 86, 87, 88, 91, 94, 106, 107, 407/108
See application file for complete search history.

(56) References Cited

U.S. PATENT DOCUMENTS

| | | | | |
|---|---|---|---|---|
| 2,032,965 A | * | 3/1936 | Wellington | 407/79 |
| 2,390,653 A | * | 12/1945 | Kilgore | 407/108 |
| 2,751,801 A | | 6/1956 | Hostetter | |
| 3,125,798 A | * | 3/1964 | Stein | 407/83 |
| 3,497,935 A | * | 3/1970 | Bowling | 407/108 |
| 3,531,842 A | | 10/1970 | Bowling | |
| 3,596,337 A | * | 8/1971 | Arnold et al. | 407/86 |
| 3,811,162 A | * | 5/1974 | Bay | 407/108 |
| 3,846,882 A | * | 11/1974 | Stein | 407/87 |
| 4,080,854 A | * | 3/1978 | Peterson | 82/158 |
| 5,031,492 A | | 7/1991 | Zinner | |
| 5,079,979 A | | 1/1992 | Pano | |
| 7,419,337 B2 | * | 9/2008 | Berminge | 407/101 |
| 2007/0110526 A1 | | 5/2007 | Nicholas | |

FOREIGN PATENT DOCUMENTS

| | | |
|---|---|---|
| EP | 0257005 | 2/1988 |
| GB | 759147 | 10/1956 |
| GB | 1366428 | 9/1974 |
| JP | 20000052123 | 8/2001 |
| WO | 2006118506 | 11/2006 |

OTHER PUBLICATIONS

International Search Report dated Feb. 18, 2010 issued in corresponding International Application No. PCT/IL2009/001044.
Official Action dated Nov. 23, 2011 issued in counterpart Israeli application (No. 195696).

* cited by examiner

*Primary Examiner* — Will Fridie, Jr.
(74) *Attorney, Agent, or Firm* — Womble Carlyle

(57) ABSTRACT

A tool holder for clamping an insert holder has a main block, two clamping members and a single adjustment member. The main block has a longitudinal side surface with a longitudinal groove with upper and lower walls. The two clamping members include mirror symmetrical left and right clamping members interfacing with two inclined non-parallel planar ramping surfaces of the lower wall of the longitudinal groove. A blade-shaped insert holder is mounted in the longitudinal groove on the two clamping members. The adjustment member interfaces with the two clamping members, and when rotated causes each clamping member to move up its respective non-parallel planar ramping surface, decreasing the distance between the two clamping members and the upper wall of the longitudinal groove until a clamping force is uniformly applied between the insert holder and the upper wall of the longitudinal groove.

25 Claims, 4 Drawing Sheets

TOOL HOLDER FOR CLAMPING AN INSERT HOLDER

FIELD OF THE INVENTION

The present invention relates to a tool holder for use in metal cutting processes in general, and for parting and grooving operations in particular.

BACKGROUND OF THE INVENTION

Within the field of parting and grooving of a rotating metal workpiece, a cutting insert may be secured in a blade shaped insert holder, and the insert holder in turn releasably retained in a tool holder. The tool holder typically comprises a main block with a longitudinal channel or groove, and a means of clamping the insert holder within the longitudinal channel or groove.

U.S. Pat. No. 5,031,492 and U.S. Pat. No. 5,079,979 each disclose a tool holder, where an insert holder is clamped within a main block by means of a single clamping member. The clamping member forms an upper wall of a longitudinal groove and interfaces with an upper ridge shaped surface of the insert holder. Several clamping screws pass through holes in the clamping member and into corresponding threaded bores in the main block. A clamping operation is performed by rotating the clamping screws until each applies a sufficient clamping force between the insert holder and a lower wall of the longitudinal groove of the main block. The clamping forces are released by rotating the clamping screws in an opposite direction. They both employ at least three clamping screws thereby requiring the screwing of at least three screws. They both require approach from the top to tighten the screws, which may not always be possible.

U.S. Pat. No. 3,531,842 discloses a tool holder, where a cutting insert and support blade are clamped within a main block by means of a single wedge shaped clamping member. The wedge shaped clamping member is positioned against an upper wall of a longitudinal groove of the main block and interfaces with an upper surface of the cutting insert. A means of clamping actuation is provided by a double threaded member interfacing with corresponding threaded bores in the main block and the wedge shaped clamping member. A clamping operation is performed by rotating the double threaded member, which causes the wedge shaped clamping member to move in a longitudinal direction relative to the main block, until a sufficient clamping force is applied between the cutting insert and support blade and a lower wall of the longitudinal groove of the main block. The clamping force is released by rotating the double threaded member in an opposite direction. Although the clamping operation is performed by a single means of clamping adjustment, this solution has a limited flexibility of configuration in that the cutting insert can only operate from one end of the main block. Also, clamping is provided along only a short section of the longitudinal groove, thus limiting the distance that the cutting insert and support blade can be extended beyond the main block and acceptably perform a parting and grooving operation.

SUMMARY OF THE INVENTION

In accordance with preferred embodiments of the present invention, there is provided a tool holder comprising:
a main block having a longitudinal side surface with a longitudinal groove with opposing first and second walls;
two wedge shaped clamping members, supported by the second wall of the longitudinal groove; and
a single adjustment member operatively connected to each of the two clamping members;
wherein the two clamping members clamp a blade shaped insert holder against the first wall of the longitudinal groove.

Also in accordance with preferred embodiments of the present invention, there is a method of clamping a blade shaped insert holder in a tool holder, the tool holder comprising:
a main block having a longitudinal side surface with a longitudinal groove with opposing first and second walls;
two wedge shaped clamping members, supported by the second wall of the longitudinal groove; and
a single adjustment member operatively connected to each of the two clamping members,
the method comprising the steps of:
mounting the insert holder in the longitudinal groove to interface with the two clamping members; and
rotating the adjustment member to cause movement of each clamping member up a respective inclined non-parallel planar ramping surface of the second wall of the longitudinal groove, until a distance between the two clamping members and the first wall of the longitudinal groove is decreased to a point wherein a clamping force is applied between the insert holder and the first wall of the longitudinal groove.

Further in accordance with preferred embodiments of the present invention, there is provided a tool holder comprising:
a main block having a first wall spaced apart from a second wall, the first wall facing in a direction of the second wall, the second wall comprising first and second ramping surfaces which extend away from each other and towards the first wall;
left and right clamping members supported by the first and second ramping surfaces, respectively, the left and right clamping members having respective first and second clamping surfaces which face in a direction of the first wall; and
an adjustment member operatively connected to both clamping members; wherein:
the left and right clamping members are configured to travel along the first and second ramping surfaces and thereby adjust a distance between their clamping surfaces and the first wall, in response to operation of the adjustment member.

BRIEF DESCRIPTION OF THE DRAWINGS

For a better understanding, the invention will now be described, by way of example only, with reference to the accompanying drawings in which.

DETAILED DESCRIPTION OF THE INVENTION

Figure 1:
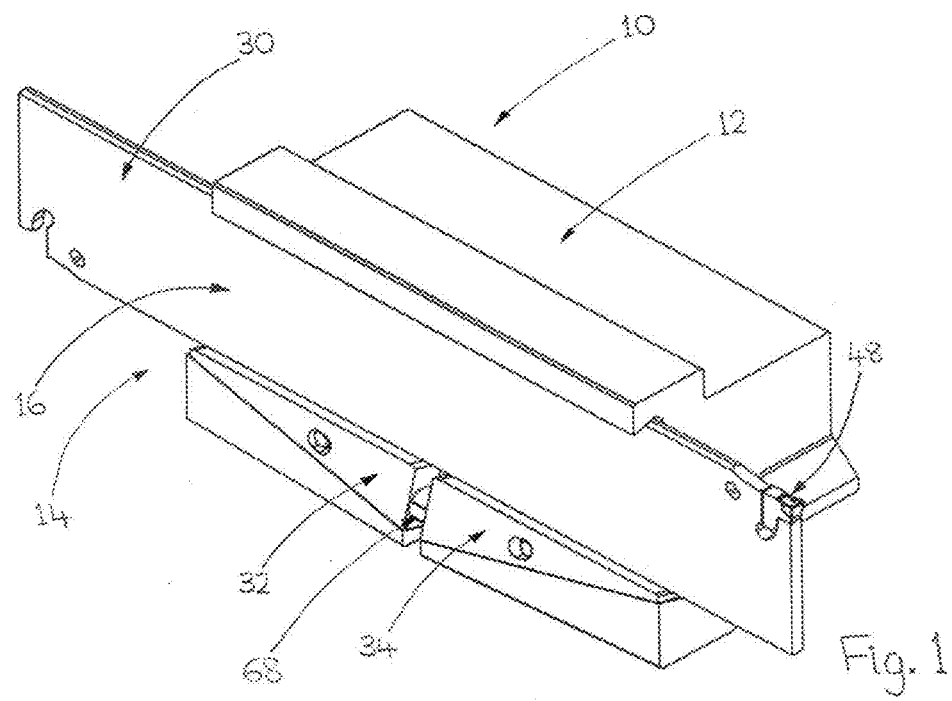
FIG. 1 is a perspective view of a tool holder in accordance with a first embodiment of the present invention.
Figure 2:
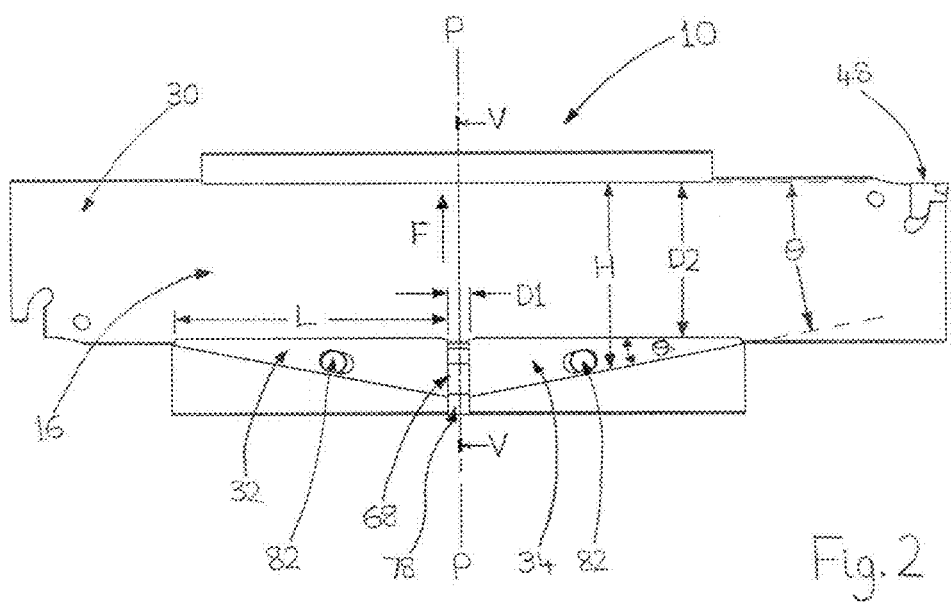
FIG. 2 is a side view of the tool holder shown in FIG. 1.
Figure 3:
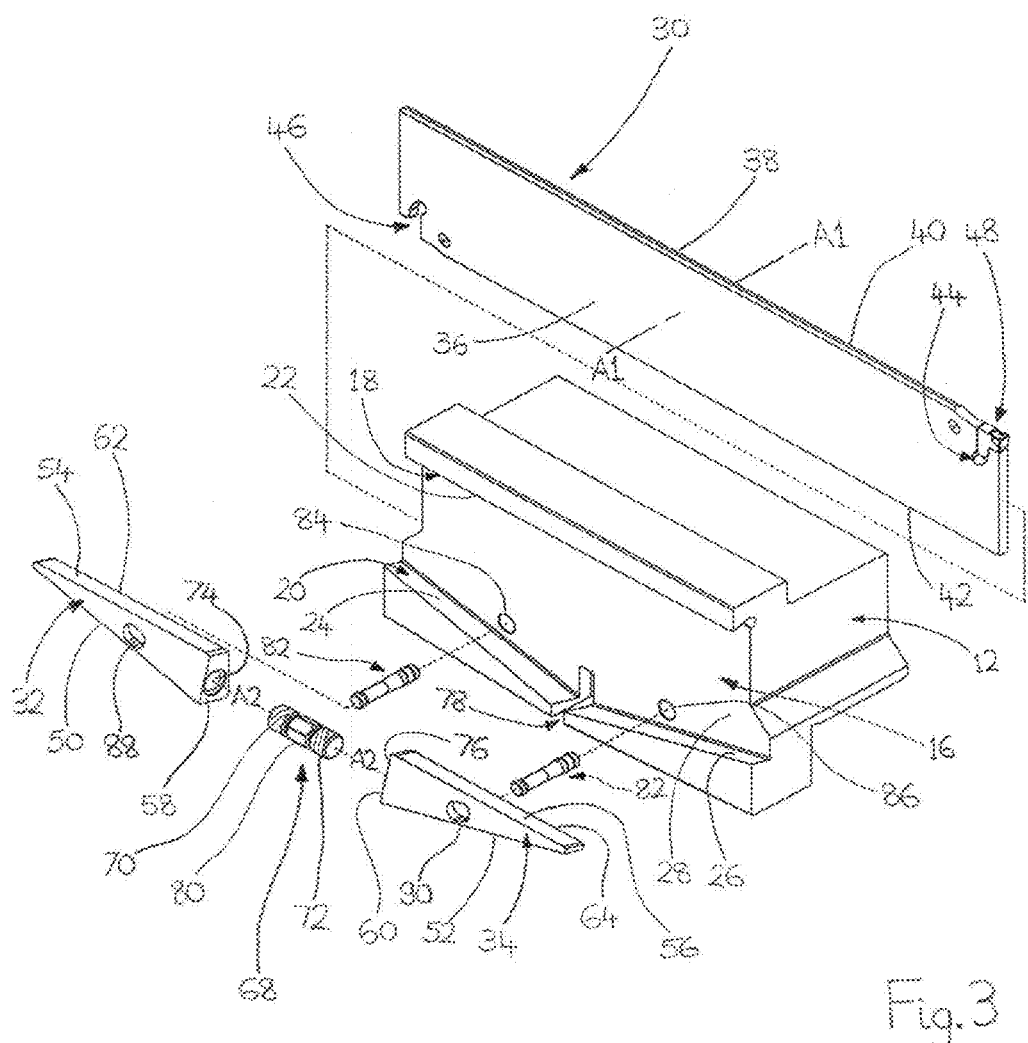
FIG. 3 is an exploded perspective view of the tool holder shown in FIG. 1.

Attention is drawn to FIGS. 1 to 3, showing a tool holder 10 comprising a main block 12 with four longitudinal side surfaces, where a first longitudinal side surface 14 has a longitudinal groove 16 with opposing first and second walls 18, 20. Henceforth, without loss of generality, the first wall 18 will be referred to as the "upper wall 18" and the second wall 20 will be referred to as the "lower wall 20".

The main block 12 has mirror symmetry about a central plane P perpendicular to the first longitudinal side surface 14, where the upper wall 18 of the longitudinal groove 16 has a single planar surface 22 and the opposing lower wall 20 of the longitudinal groove 16 has two non-parallel planar ramping surfaces 24, 26.

Each of the two non-parallel planar ramping surfaces 24, 26 of the lower wall 20 of the longitudinal groove 16 are inclined at an acute angle θ relative to the single planar surface 22 of the opposing upper wall 18, in a side view as shown in FIG. 2, where the longitudinal groove 16 has a height dimension H which increases towards the central plane P.

Figure 4:
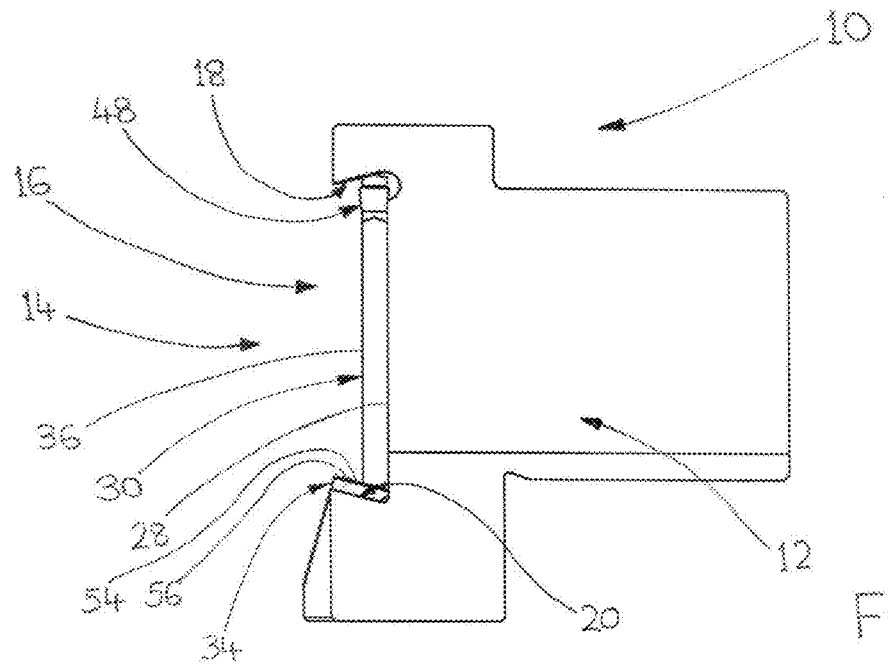
FIG. 4 is an end view of the tool holder shown in FIG. 1.

The longitudinal groove 16 may have a dovetail shape in an end view as shown in FIG. 4, where each of the opposing upper and lower walls 18, 20 is inclined relative to a side wall 28 of the longitudinal groove 16.

A blade shaped insert holder 30 is mounted in the longitudinal groove 16 of the main block 12 and clamped against the upper wall 18 of the longitudinal groove 16 by two wedge shaped clamping members 32, 34.

The insert holder 30 has two opposing major side surfaces 36, 38 and parallel upper and lower ridge shaped surfaces 40, 42. The insert holder 30 may be rotationally symmetrical by 180° about a lateral axis A1 perpendicular to the two major side surfaces 36, 38 and include two insert receiving pockets 44, 46, as shown in FIG. 3. A cutting insert 48 is secured in one or both of the insert receiving pockets 44, 46.

The two clamping members 32, 34 are comprised of a left clamping member 32 and a non-identical right clamping member 34, each having an acute wedge angle between a planar support surface 50, 52 and a planar clamping surface 54, 56. The left and right clamping members 32, 34 are mirror symmetrical and have adjustment surfaces 58, 60 adjacent the support and clamping surfaces 50, 52 and 54, 56.

The support surface 50 of the left clamping member 32 interfaces with a first non-parallel planar ramping surface 24 of the lower wall 20 of the longitudinal groove 16, and the support surface 52 of the right clamping member 34 interfaces with a second non-parallel planar ramping surface 26 of the lower wall 20 of the longitudinal groove 16.

The clamping surfaces 54, 56 of the left and right clamping members 32, 34 are co-planar and may be inclined relative to the side wall 28 of the longitudinal groove 16, when viewed in the direction of the central plane P, as shown in FIG. 4. The clamping surfaces 54, 56 of the left and right clamping members 32, 34 each have longitudinal edges 62, 64 of length L which are co-linear, and parallel to the upper wall 18 of the longitudinal groove 16. The longitudinal groove 16 may have a length approximately equal to 2L.

According to a first embodiment of the present invention, a clamping operation is performed by a single adjustment member 68. In accordance with the first embodiment, the adjustment member 68 is generally cylindrical shaped with a central axis A2 and left and right handed male threaded ends 70, 72. The central axis A2 of the adjustment member 68 is parallel to the clamping surfaces 54, 56 of the left and right clamping members 32, 34, and the left handed male threaded end 70 mates with a left handed female threaded bore 74 in the adjustment surface 58 of the left clamping member 32, and the right handed male threaded end 72 mates with a right handed female threaded bore 76 in the adjustment surface 60 of the right clamping member 34.

As shown in FIG. 3, a central gap 78 between the first and second non-parallel planar ramping surfaces 24, 26 of the lower wall 20 of the longitudinal groove 16 provides access for a spanner (not shown) to engage with two opposing flat surfaces of a hexagonal profiled middle portion 80 of the adjustment member 68, and be rotated in a clockwise or anti-clockwise direction.

Figure 5:
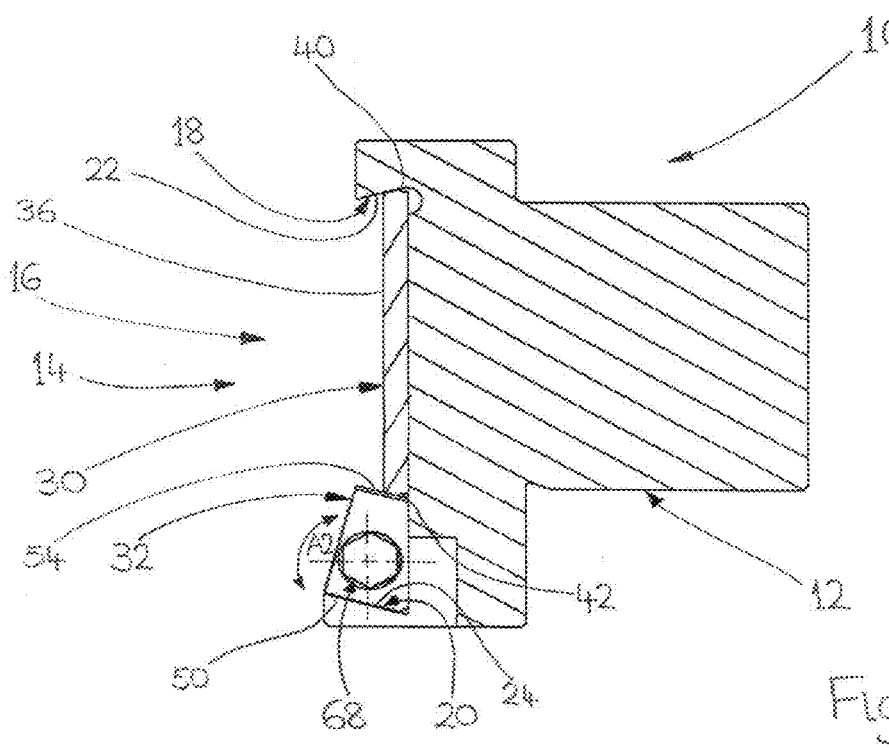
FIG. 5 is a cross sectional view of the tool holder shown in FIG. 2 taken along the line V-V.

References to clockwise and anti-clockwise direction in this first embodiment of the present invention are made with respect to rotation of the adjustment member 68 about the central axis A2, when viewed in the direction as shown in FIG. 5.

Rotation of the adjustment member 68 in a clockwise direction causes the left and right handed male threaded ends 70, 72 to simultaneously 'unscrew' from their respective female threaded bores 74, 76 of the left and right clamping members 32, 34, resulting in an increased distance D1 between the adjustment surfaces 58, 60 of the two clamping members 32, 34.

The increased distance D1 corresponds with a decreased distance D2 between the co-planar clamping surfaces 54, 56 of the left and right clamping members 32, 34 and the upper wall 18 of the longitudinal groove 16 due to the movement of the left and right clamping members 32, 34 up the inclined first and second non-parallel ramping surfaces 24, 26, respectively. The relationship between a change in distance D1 of magnitude $\Delta D1$ and a change in distance D2 of magnitude $\Delta D2$ is given by the following equation; $\Delta D2=\Delta D1 \tan \theta/2$, and where $\Delta D2$ occurs simultaneously and uniformly along the longitudinal length L of each co-planar clamping surface 54, 56 of the left and right clamping member 32, 34.

The co-planar clamping surfaces 54, 56 of the left and right clamping members 32, 34 simultaneously interface with the lower ridge shaped surface 42 of the insert holder 30, and at a point of the clamping adjustment where distance D2 is sufficiently decreased a clamping force F is uniformly applied between the upper ridge shaped surface 40 of the insert holder 30 and the upper wall 18 of the longitudinal groove 16.

Rotation of the adjustment member 68 in an anti-clockwise direction, causes the left and right handed male threaded ends 70, 72 to simultaneously 'screw' into their respective female threaded bores 74, 76 of the left and right clamping members 32, 34, resulting in a decreased distance D1 between the adjustment surfaces 58, 60 of the two clamping members 32, 34.

The decreased distance D1 corresponds with an increased distance D2 between the co-planar clamping surfaces 54, 56 of the left and right clamping members 32, 34 and the upper wall 18 of the longitudinal groove 16, where a change in distance D2 of magnitude $\Delta D2$ occurs simultaneously and uniformly along the longitudinal length L of each co-planar clamping surface 54, 56 of the left and right clamping member 32, 34.

Thus, as can be seen from the foregoing, the main block 12 has an upper wall 18 spaced apart from a lower wall 20 and facing in a direction of the lower wall 20. The lower wall's ramping surfaces 24, 26 extend away from each other and towards the upper wall 18. The left and right clamping members 32, 34 are supported by the first and second ramping surfaces 24, 26 and have respective first and second clamping surfaces 54, 56 which face in a direction of the upper wall 18, and the adjustment member 68 is operatively connected to both clamping members 32, 34. The left and right clamping members 32, 34 are configured to travel along the first and second ramping surfaces 24, 26 and thereby adjust the distance D2 between both of the left and right clamping surfaces 54, 56 and the upper wall 18, in response to operation of the adjustment member 68.

At a point of clamping adjustment where distance D2 is sufficiently increased, the clamping force F is uniformly released from between the upper ridge shaped surface 40 of the insert holder 30 and the upper wall 18 of the longitudinal groove 16.

Two identical retaining pins 82 are removably fixed into mounting holes 84, 86 in the main block 12, where each retaining pin 82 interfaces with a retaining slot 88, 90 in each of the two clamping members 32, 34. The retaining pins 82 help ensure that each clamping member 32, 34 remains supported by its corresponding ramping surface and in close proximity with the side wall 28 of the longitudinal groove 16 during clamping adjustment and during parting and grooving operations. As an alternative to retaining pins 82 removably fixed into mounting holes 84, 86, two retaining screws may be removably fixed into threaded bores in the main block 12.

In some embodiments, the adjustment member 68 may also be configured such that the left handed male threaded end 70 mates with a female threaded bore in the adjustment surface 60 of the right clamping member 34, and the right handed male threaded end 72 mates with a male threaded bore in the adjustment surface 58 of the left clamping member 32. For this alternative configuration, rotation of the adjustment member 68 in an anti-clockwise direction promotes clamping of the insert holder 30 against the upper wall 18 of the longitudinal groove 16, and rotation of the adjustment member 68 in a clockwise direction promotes release of the insert holder 30 from the upper wall 18 of the longitudinal groove 16.

An advantage of the present invention is that during parting and grooving operations, the cutting action between the operative cutting insert 48 and a rotating workpiece (not shown) attempts to force the insert holder 30 and the two clamping members 32, 34 rearwards in a longitudinal direction, resulting in the rear-most left clamping member 32 exerting an increased clamping force between the insert holder 30 and the upper wall 18 of the longitudinal groove 16. Since the main block 12 is symmetrical about the central plane P, the insert holder 30 and operative cutting insert 48 may be configured such that the left clamping member 32 or the right clamping member 34 is rear-most in the tool holder 10, where each configuration provides an equally high level of clamping performance.

Significant cutting forces are also transmitted through the operative cutting insert 48 and insert holder 30 in a downward direction through the forward-most right clamping member 34, where since the main block 12 is symmetrical about the central plane P, the insert holder 30 and operative cutting insert 48 may be configured such that the left clamping member 32 or the right clamping member 34 is forward-most in the tool holder 10. Another advantage of the present invention is that the two clamping members 32, 34 are replaceable components with relatively simple geometry, and can be economically manufactured from a hardened material to provide improved wear resistance.

Although the tool holder 10 may be typically secured in a turret head recess (not shown), with the insert holder 30 positioned above the two clamping members 32, 34 and the operative cutting insert 48 secured in a first insert receiving pocket 44 adjacent the upper wall 18 of the longitudinal groove 16, it should be appreciated that the tool holder 10 may also be configured such that the insert holder 30 is positioned below the two clamping members 32, 34 and the operative cutting insert 48 secured in a second insert receiving pocket 46 adjacent the lower wall 20 of the longitudinal groove 16. This flexibility of configuration has an advantage in situations where greater access is required to turret head securing features (not shown) from below the first longitudinal side surface 14 of the main block 12, where the upper wall 18 of the longitudinal groove 16 can be described as a lower wall, and the lower wall 20 of the longitudinal groove 16 can be described as an upper wall.

Figure 6:
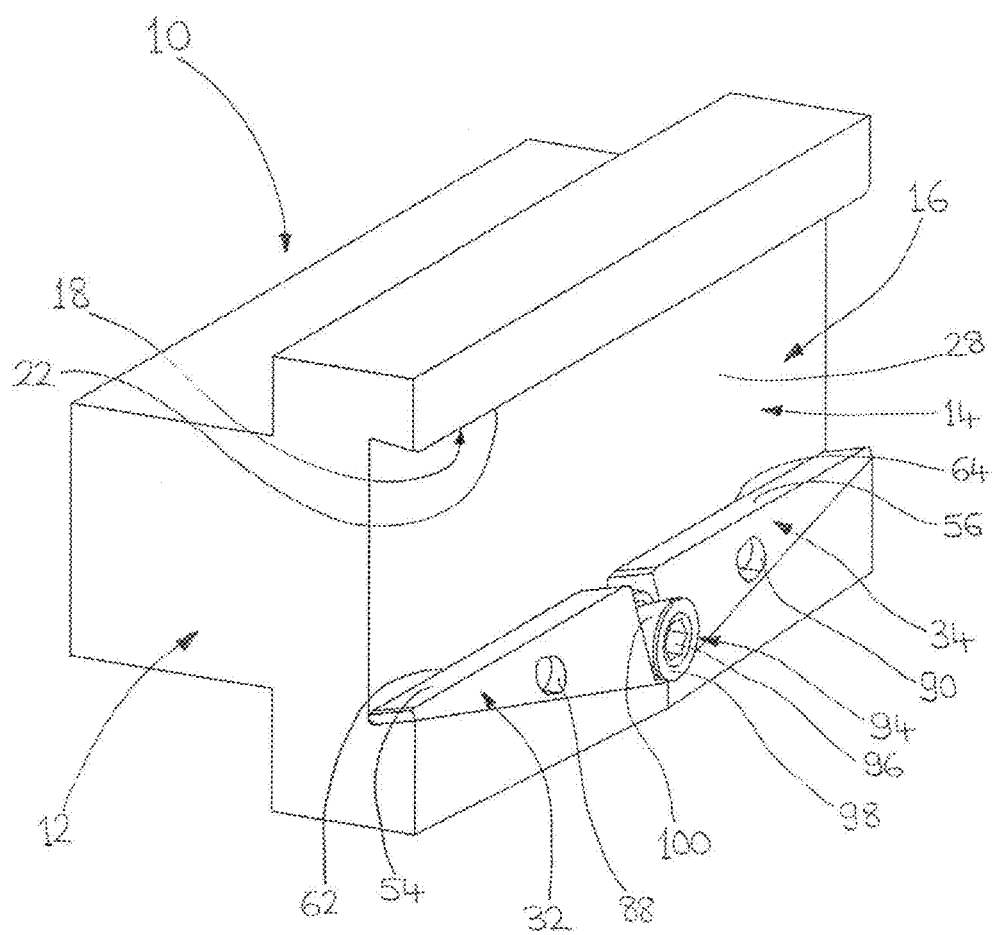
FIG. 6 is of a perspective view of a tool holder in accordance with a second embodiment of the present invention.

Reference is now made to FIG. 6. In accordance with a second embodiment of the present invention, an alternative single adjustment member 94 is employed. This adjustment member 94 is frustoconical shaped and threadably engages the first longitudinal side surface 14 of the main block 12, between the two clamping members 32, 34. The frustoconical shaped adjustment member 94 has a hexagonal profiled recess 96 in an outwardly facing major diameter base surface 98 which provides means for an Allen key (not shown) to rotate the frustoconical shaped adjustment member 94 in a clockwise or anti-clockwise direction, when viewed in the direction of the first longitudinal side surface 14. A peripheral contact surface 100 adjacent the outwardly facing major diameter base surface 98 makes simultaneous contact with each of the two clamping members 32, 34.

Rotation of the frustoconical shaped adjustment member 94 in a clockwise direction causes the outwardly facing major diameter base surface 98 to move towards the first longitudinal side surface 14 and an increased diameter portion of the peripheral contact surface 100 to make contact with the two clamping members 32, 34, resulting in an increased distance D1 between the adjustment surfaces 58, 60 of the two clamping members 32, 34.

The increased distance D1 corresponds with a decreased distance D2 between the co-planar clamping surfaces 54, 56 of the left and right clamping members 32, 34 and the upper wall 18 of the longitudinal groove 16. At a point of the clamping adjustment where D2 is sufficiently decreased, a clamping force F is uniformly applied between the upper ridge shaped surface 40 of the insert holder 30 and the upper wall 18 of the longitudinal groove 16.

An advantage of the second embodiment of the present invention is that rotation of the frustoconical shaped adjustment member 94 and thus clamping of the insert holder 30, can be performed with limited access to the first longitudinal side surface 14.

Although the present invention has been described to a certain degree of particularity, it should be understood that various alterations and modifications could be made without departing from the spirit or scope of the invention as hereinafter claimed.

What is claimed is:

1. A tool holder comprising:
    a main block having a longitudinal side surface with a longitudinal groove with opposing first and second walls;
    two wedge shaped clamping members, supported by the second wall of the longitudinal groove; and
    a single adjustment member operatively connected to each of the two clamping members;
    wherein the two clamping members clamp a blade shaped insert holder against the first wall of the longitudinal groove.

2. The tool holder according to claim 1, wherein the main block has mirror symmetry about a central plane perpendicular to the longitudinal side surface.

3. The tool holder according to claim 2, wherein the longitudinal groove has a dovetail shape when viewed in the direction of the central plane.

4. The tool holder according to claim 2, wherein the longitudinal groove has a height dimension which increases towards the central plane.

5. The tool holder according to claim 1, wherein the first wall has a single planar surface and the opposing second wall has two non-parallel planar ramping surfaces.

6. The tool holder according to claim 1, wherein the two clamping members are non-identical.

7. The tool holder according to claim 1, wherein the single adjustment member has a generally cylindrical shape and comprises threads of opposite hand.

8. The tool holder according to claim 1, wherein the single adjustment member has a frustoconical shape and comprises a peripheral contact surface.

9. The tool holder according to claim 1, wherein the two clamping members each have a wedge angle between a support surface and a clamping surface.

10. The tool holder according to claim 9, wherein the support surfaces of the two clamping members interface with the second wall of the longitudinal groove.

11. The tool holder according to claim 9, wherein the clamping surfaces of the two clamping members interface with the insert holder.

12. The tool holder according to claim 9, wherein the single adjustment member has a central axis parallel with the clamping surfaces of the two clamping members.

13. The tool holder according to claim 9, wherein the clamping surfaces of the two clamping members each have a longitudinal edge of length L, parallel to the first wall of the longitudinal groove.

14. The tool holder according to claim 13, wherein the longitudinal edges are co-linear.

15. The tool holder according to claim 13, wherein the longitudinal groove of the main block has a length approximately equal to 2L.

16. The tool holder according to claim 13, wherein the two clamping members each have an adjustment surface adjacent their respective support surfaces and clamping surfaces, and
wherein a distance between the longitudinal edges of the clamping surfaces and the first wall of the longitudinal groove is inversely proportional to a distance between the adjustment surfaces of the two clamping members.

17. The tool holder according to claim 1, wherein the single adjustment member has a central axis, and
wherein a distance between the two clamping members is increased by rotation of the adjustment member in one direction about its central axis and decreased by rotation of the adjustment member in an opposite direction about its central axis.

18. The tool holder according to claim 1, wherein the single adjustment member has a central axis, and
wherein a distance between the two clamping members is increased by rotation of the adjustment member about its central axis.

19. A method of clamping a blade shaped insert holder in a tool holder, the tool holder comprising:
a main block having a longitudinal side surface with a longitudinal groove with opposing first and second walls;
two wedge shaped clamping members, supported by the second wall of the longitudinal groove; and
a single adjustment member interfacing with each of the two clamping members,
the method comprising the steps of:
mounting the insert holder in the longitudinal groove to interface with the two clamping members; and
rotating the adjustment member to cause movement of each clamping member up a respective inclined non-parallel planar ramping surface of the second wall of the longitudinal groove, until a distance between the two clamping members and the first wall of the longitudinal groove is decreased to a point wherein a clamping force is applied between the insert holder and the first wall of the longitudinal groove.

20. A tool holder comprising:
a main block having a first wall spaced apart from a second wall, the first wall facing in a direction of the second wall, the second wall comprising first and second ramping surfaces which extend away from each other and towards the first wall;
left and right clamping members supported by the first and second ramping surfaces, respectively, the left and right clamping members having respective first and second clamping surfaces which face in a direction of the first wall; and
an adjustment member operatively connected to both clamping members; wherein:
the left and right clamping members are configured to travel along the first and second ramping surfaces and thereby adjust a distance between their clamping surfaces and the first wall, in response to operation of the adjustment member.

21. The tool holder according to claim 20, wherein:
The left and right clamping members each have an adjustment surface, with the adjustment surface of the left clamping member facing the adjustment surface of the right clamping member; and
the adjustment member comprises threads of opposite hand which are operatively connected to the adjustment surfaces of the left and right clamping members.

22. The tool holder according to claim 20, wherein:
the left and right clamping members each have an adjustment surface, with the adjustment surface of the left clamping member facing the adjustment surface of the right clamping member; and
the adjustment member has a frustoconical shape and comprises a peripheral contact surface which is operatively connected to the adjustment surfaces of the left and right clamping members.

23. The tool holder according to claim 20, wherein:
the left and right clamping members each have a support surface which abuts a corresponding ramping surface; and
the left and right clamping members are both wedge shaped, each clamping member having an acute wedge angle between its support surface and its clamping surface.

24. The tool holder according to claim 20, wherein:
each clamping member is provided with a retaining slot; and
a retaining pin or retaining screw removably fixed to the main block interfaces with the retaining slot to help ensure that an associated clamping member remains supported by its corresponding ramping surface.

25. The tool holder according to claim 20, further comprising:
an insert holder clamped between the first wall and the clamping surfaces of the left and right clamping members.

* * * * *